2,081,726

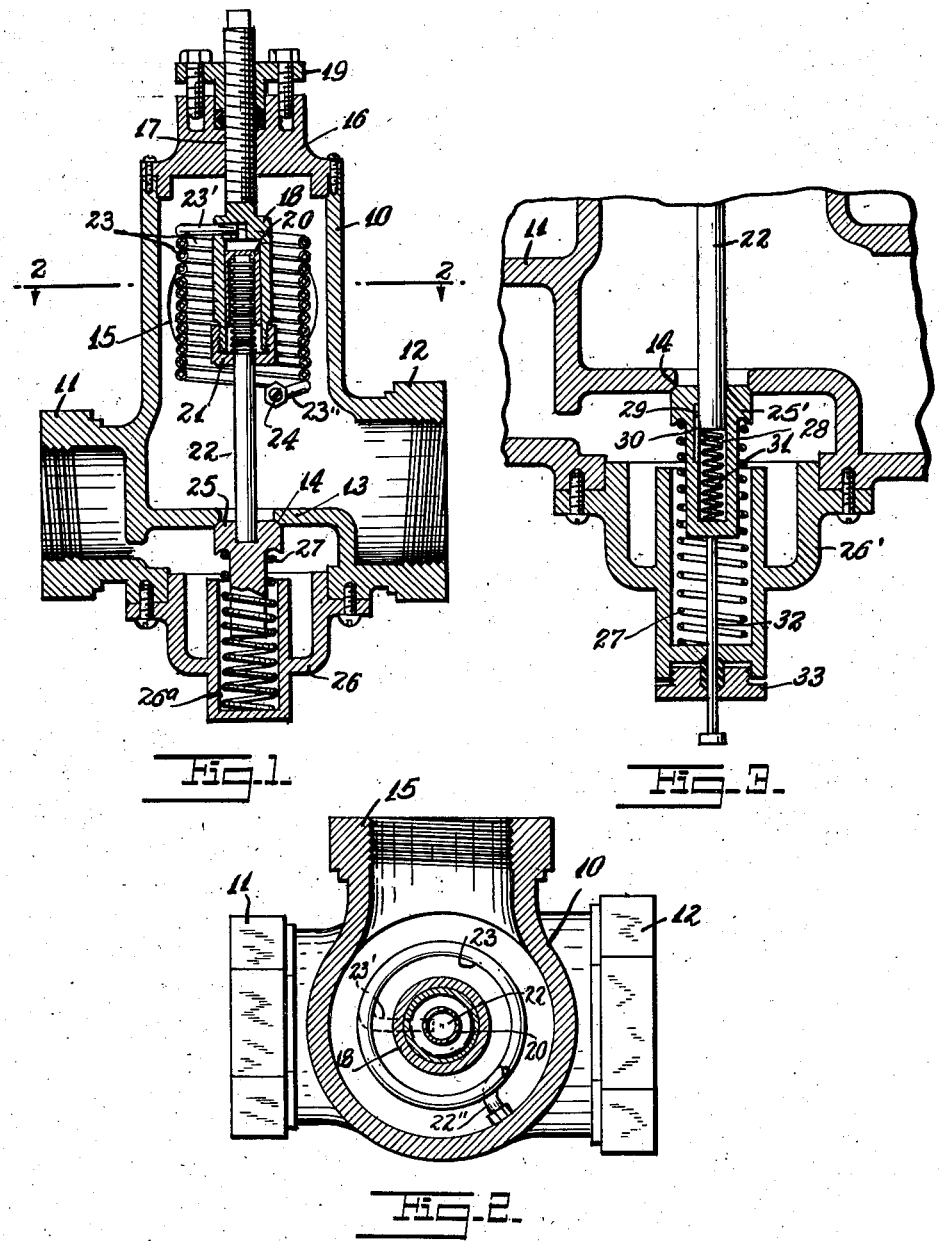
May 25, 1937.  E. BABBIN  2,081,726
AUTOMATIC MIXING VALVE
Filed Feb. 21, 1935
INVENTOR
EDWARD BABBIN
BY
ATTORNEY Patented May 25, 1937

UNITED STATES PATENT OFFICE 2,081,726

AUTOMATIC MIXING VALVE

Edward Babbin, Spring Valley, N. Y.

Application February 21, 1935, Serial No. 7,517

5 Claims. (Cl. 236—12)

This invention relates to new and useful improvements in a thermostatic controlled mixing valve.

The invention has for an object the provision in a device as mentioned of a cylindrical body having opposed side inlets for hot and cold water separated by a horizontal partition formed with a valve seat, and an outlet for tempered water arranged at right angles to the inlets.

Still further the invention proposes to construct the cylindrical body with an open top and bottom ends, and to close these ends with removable caps to facilitate reaching of the interior parts of the valve.

Another one of the objects of this invention is an arrangement whereby the bottom cap is provided with a compartment housing an expansion spring engaging against a valve operating on the valve seat of the horizontal partition previously mentioned.

Still further the invention contemplates the provision of manual means for closing the valve on its seat irrespective of the functioning of the thermostat. The advantage of this arrangement resides in the fact that the discharge of water may be 100% of the hot water, if so desired, and obtained without an adjustment or change of the action of the thermostat.

Another object of this invention is the construction of a device as described which is simple and durable and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a vertical sectional view of a valve constructed according to this invention.

Fig. 2 is a horizontal sectional view taken on the line 2—2 of Fig. 1.

Fig. 3 is a fragmentary view of the lower portion of a valve constructed according to a modification of the invention.

The thermostatic controlled mixing valve, according to this invention, comprises a cylindrical body 10 having opposed side inlets 11 and 12 respectively, for hot and cold water, separated by a horizontal partition 13 formed with a valve seat 14 and an outlet 15 for the tempered water, preferably arranged at right angles to the inlets.

The cylindrical body 10 is formed with an open top closed by a removable cap 16. A stud 17 threadedly engages through the top cap 16 and is fixedly connected with a casing 18 of a thermostat. A packing gland 19 is mounted on the cap 16 for producing a water tight joint at the passage of the stud 19, to the exterior of the cap.

The thermostat consists of a piston 20 slidable within the casing 18. A cap 21 is mounted upon the bottom of the casing 18 closing the interior compartment thereof. A valve rod 22 passes through the cap 21 and is threadedly connected with the piston 20. A hollow coil 23 encompasses the thermostatic casing and has one end 23' connected with the top of the chamber in which the piston 20 functions. The other end 23'' of the coil 23 is closed with a removable screw 24. Thermostatic liquid is engaged within the coil, into the coil upon the removal of the screw. Thereafter the screw is replaced and the liquid may function according to the temperature of the water passing around the coil 23.

A valve 25 is fixed on the lower end of the valve rod 22 and engages the seat 14. The bottom of the cylindrical body 10 is closed with a bottom cap 26. This bottom cap has a central compartment 26ª in which there is housed an expansion spring 27. This spring acts against the base wall of the compartment and the valve 25 for urging the valve upon its seat.

In Fig. 3 a modified construction of the device is illustrated in which the valve stem 22 is resiliently connected with the valve 25'. More particularly, the end of the valve rod slidably engages into a compartment 28 in the valve. A radial pin 29 from the valve stem 22 engages in a slot 30 formed in the material of the valve 25' so as to prevent complete separation of these parts. A spring 31 is housed within the compartment 28 and acts against the base of the compartment and the end of the valve stem 22. A rod 32 is mounted upon the lower end of the valve 25' and extends through the cap 26' to the exterior. A packing gland 33 is mounted upon the bottom cap 26' and encompasses the rod 32.

The operation of the thermostatic mixing valve is as follows:—The inlet 12 is connected with a supply of hot water. The inlet 11 is connected with a supply of cold water. As water is drawn from the outlet 15 it will circulate between the turns of the coil 23 and affect the thermostatic liquid. If the water is above a pre-determined temperature, the liquid within the coil 23 will expand so as to move the piston 20 downwards. This causes the valve 25 to open, allowing cold water to enter and mix with the hot water and thus brings the temperature of the discharged water down to the desired degree.

The degree at which the valve 25 functions may be varied by turning the stud 17 in one direction or the other. Such adjustment has the effect of changing the size of the compartment in which the piston 20 operates, when the valve 25 is in the closed position. Necessarily, the valve will open at a different temperature since at all times it is necessary that the liquid expand to the full capacity of the interior of the casing 18 before the piston 20 is moved. The spring 27 aids in returning the valve 25 to its closed position when the thermostat permits such action.

In the form of the invention illustrated in Fig. 3, there is a provision by which the valve 25' may be closed, even though the thermostat is in a condition in which the valve would normally be open. The advantage of this construction resides in the fact that if it is desired to draw a supply of hot water without changing the thermostatic setting, it is easily possible to do so. The spring 31 must be of sufficient rigidity so as not to interfere with the proper functioning of the thermostat. When the thermostat moves the rod 22 downwards, this motion must be communicated to open the valve 25'. If it is desired to close the valve, the stem 32 may be manually forced upwards so that the spring 31 is compressed and the valve 25 engaged upon its seat.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a thermostatic controlled mixing valve, a cylindrical body having opposed side inlets for hot and cold water supplies and a horizontal partition separating said inlets and formed with a valve seat in the inlet for the cold water, and an outlet for tempered water permanently connected with the inlet for the hot water, a top cap closing the top of said cylindrical body, a thermostat in the tempered water passage adjustably supported from said cap and having an operator rod, a valve secured to said operator rod and engageable with said seat, a bottom cap closing the bottom of said cylindrical body, and a spring acting between the body and the valve to urge the valve closed, and a means for manually closing said valve against the normal opening action of the thermostat.

2. In a thermostatic controlled mixing valve, a cylindrical body having opposed side inlets for hot and cold water supplies, and a horizontal partition separating said inlets and formed with a valve seat, and an outlet for tempered water permanently connected with one of said inlets, a top cap closing the top of said cylindrical body, a thermostat in the tempered water passage adjustably supported from said cap and having an operator rod, a valve on said operator rod and engageable with said seat, a bottom cap closing the bottom of said cylindrical body, and a spring acting between the body and the valve to urge the valve closed, said valve being resiliently mounted on the operator rod, and a stem from the valve extends to the exterior of the mixing valve by which the valve may be manually closed against an opening action of the thermostat.

3. In a thermostatically controlled mixing valve, a cylindrical body having opposed side inlets for hot and cold water supplies, and a horizontal partition formed with a valve seat, and an outlet for tempered water, a top cap closing the top of said cylindrical body, a thermostat in the tempered water passage adjustably supported from said cap and having an operator rod, a valve on said operator rod and engageable with said seat, a bottom cap closing the bottom of said cylindrical body, and a spring acting between the body and the valve to urge the valve closed, said valve being slidably mounted on the operator rod, a spring acting between the valve and the operator rod for resiliently connecting these parts together, and a stem extending from the valve to the exterior of the mixing valve by which the valve may be manually closed against an opening action of the thermostat.

4. In a thermostatically controlled mixing valve, a cylindrical body having opposed side inlets for hot and cold water supplies, and a horizontal partition formed with a valve seat, and an outlet for tempered water, a top cap closing the top of said cylindrical body, a thermostat in the tempered water passage adjustably supported from said cap and having an operator rod, a valve on said operator rod engageable with said seat, a bottom cap closing the bottom of said cylindrical body, and a spring acting between the body and the valve to urge the valve closed, said valve being slidably mounted on the operator rod, a spring acting between the valve and the operator rod for resiliently connecting these parts together, and a stem extending from the valve to the exterior of the mixing valve by which the valve may be manually closed against an opening action of the thermostat, said valve being non-rotatively mounted on the operator rod.

5. In a thermostatically controlled mixing valve, a cylindrical body having opposed side inlets for hot and cold water supplies, and a horizontal partition formed with a valve seat, and an outlet for tempered water, a top cap closing the top of said cylindrical body, a thermostat in the tempered water passage adjustably supported from said cap and having an operator rod, a valve on said operator rod and engageable with said seat, a bottom cap closing the bottom of said cylindrical body, and a spring acting between the body and the valve to urge the valve closed, said valve being formed with a central opening communicating with the top thereof and engaging on the bottom of the operator rod, a spring acting between the valve and operator rod and disposed within said opening for resiliently connecting these parts, and a stem extending to the exterior of the mixing valve by which the valve may be manually closed against the opening action of the thermostat.

EDWARD BABBIN.